United States Patent
Stein et al.

(10) Patent No.: US 11,704,370 B2
(45) Date of Patent: Jul. 18, 2023

(54) FRAMEWORK FOR MANAGING FEATURES ACROSS ENVIRONMENTS

(71) Applicant: Microsoft Technology Licensing, LLC, Redmond, WA (US)

(72) Inventors: David J. Stein, Mountain View, CA (US); Paul T. Ogilvie, Palo Alto, CA (US); Bee-Chung Chen, San Jose, CA (US); Shaunak Chatterjee, Sunnyvale, CA (US); Priyanka Gariba, San Mateo, CA (US); Ke Wu, Sunnyvale, CA (US); Grace W. Tang, Los Altos, CA (US); Yangchun Luo, Sunnyvale, CA (US); Boyi Chen, Santa Clara, CA (US); Amit Yadav, Milpitas, CA (US); Ruoyang Wang, Palo Alto, CA (US); Divya Gadde, Sunnyvale, CA (US); Wenxuan Gao, Santa Clara, CA (US); Amit Chandak, Bangalore (IN); Varnit Agnihotri, Karnataka (IN); Wei Zhuang, Palo Alto, CA (US); Joel D. Young, Milpitas, CA (US); Weidong Zhang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1042 days.

(21) Appl. No.: 15/959,005

(22) Filed: Apr. 20, 2018

(65) Prior Publication Data
US 2019/0325085 A1    Oct. 24, 2019

(51) Int. Cl.
*G06F 16/907*    (2019.01)
*G06N 20/00*     (2019.01)
(Continued)

(52) U.S. Cl.
CPC ........ *G06F 16/907* (2019.01); *G06F 9/44505* (2013.01); *G06F 18/214* (2023.01); *G06N 20/00* (2019.01)

(58) Field of Classification Search
CPC . G06F 16/907; G06F 9/44505; G06K 9/6256; G06K 9/00288; G06N 20/00
(Continued)

(56) References Cited

U.S. PATENT DOCUMENTS

| 6,233,575 B1 | 5/2001 | Agrawal et al. |
| 9,009,088 B2 | 4/2015 | Wilson et al. |

(Continued)

FOREIGN PATENT DOCUMENTS

WO    2017106619 A1    6/2017

OTHER PUBLICATIONS

"Non Final Office Action Issued in U.S. Appl. No. 15/958,990", dated Mar. 21, 2022, 51 Pages.
(Continued)

*Primary Examiner* — Stephen S Hong
*Assistant Examiner* — Ahamed I Nazar
(74) *Attorney, Agent, or Firm* — Nicholson De Vos Webster & Elliott LLP (57) ABSTRACT

The disclosed embodiments provide a system for processing data. During operation, the system obtains a feature configuration for a feature. Next, the system obtains, from the feature configuration, an anchor containing metadata for accessing the feature in an environment. The system then uses one or more attributes of the anchor to retrieve one or more feature values of the feature from the environment. Finally, the system provides the one or more feature values for use with one or more machine-learning models.

16 Claims, 5 Drawing Sheets

(51) Int. Cl.
  *G06F 9/445* (2018.01)
  *G06F 18/214* (2023.01)
(58) Field of Classification Search
  USPC .............................................. 706/12; 715/759
  See application file for complete search history.

(56) References Cited

U.S. PATENT DOCUMENTS

| | | | |
|---|---|---|---|
| 9,064,212 | B2 | 6/2015 | Bruckhaus et al. |
| 9,411,815 | B1 | 8/2016 | Lu et al. |
| 9,449,336 | B2 | 9/2016 | Wilson et al. |
| 9,626,443 | B2 | 4/2017 | Fan et al. |
| 9,626,654 | B2 | 4/2017 | Tang et al. |
| 9,665,551 | B2 | 5/2017 | Zhuang et al. |
| 9,715,486 | B2 | 7/2017 | Zhuang et al. |
| 9,720,672 | B2 | 8/2017 | Lipton et al. |
| 9,747,365 | B2 | 8/2017 | Singh et al. |
| 9,864,430 | B2 | 1/2018 | Wu et al. |
| 10,048,749 | B2 | 8/2018 | Miao et al. |
| 10,063,570 | B2 | 8/2018 | Muddu et al. |
| 10,120,876 | B2 | 11/2018 | Desineni et al. |
| 10,146,785 | B2 | 12/2018 | Desineni et al. |
| 10,275,710 | B1 | 4/2019 | Teredesai et al. |
| 10,380,129 | B2 | 8/2019 | Golland et al. |
| 10,380,500 | B2 | 8/2019 | Miao et al. |
| 10,467,547 | B1 | 11/2019 | Range et al. |
| 10,565,504 | B2 | 2/2020 | Lindsley |
| 10,902,322 | B2 | 1/2021 | Sodhani et al. |
| 2001/0037324 | A1 | 11/2001 | Agrawal et al. |
| 2003/0050942 | A1 | 3/2003 | Ruellan et al. |
| 2008/0120594 | A1 | 5/2008 | Lucas et al. |
| 2009/0276479 | A1 | 11/2009 | Lucas et al. |
| 2012/0005645 | A1 | 1/2012 | Kopp et al. |
| 2012/0141021 | A1 | 6/2012 | Brinson et al. |
| 2013/0346274 | A1 | 12/2013 | Ferdinand et al. |
| 2014/0067758 | A1 | 3/2014 | Boldyrev et al. |
| 2014/0279762 | A1 | 9/2014 | Xaypanya et al. |
| 2014/0358826 | A1* | 12/2014 | Traupman ............... G06N 7/005 706/46 |
| 2015/0242469 | A1 | 8/2015 | Chattopadhyay et al. |
| 2015/0242760 | A1 | 8/2015 | Miao et al. |
| 2015/0379064 | A1* | 12/2015 | Xin ....................... G06K 9/6228 707/752 |
| 2015/0379166 | A1 | 12/2015 | Xin et al. |
| 2015/0379423 | A1 | 12/2015 | Dirac et al. |
| 2015/0379424 | A1 | 12/2015 | Dirac et al. |
| 2015/0379429 | A1 | 12/2015 | Lee et al. |
| 2016/0048766 | A1 | 2/2016 | Mcmahon et al. |
| 2016/0078361 | A1 | 3/2016 | Brueckner et al. |
| 2016/0314354 | A1 | 10/2016 | Teuton et al. |
| 2017/0061320 | A1 | 3/2017 | Fuchs |
| 2017/0091651 | A1 | 3/2017 | Miao et al. |
| 2017/0091652 | A1 | 3/2017 | Miao et al. |
| 2017/0109652 | A1* | 4/2017 | Stein ....................... G06N 20/00 |
| 2017/0178019 | A1 | 6/2017 | Duggan et al. |
| 2017/0178027 | A1 | 6/2017 | Duggan et al. |
| 2017/0261972 | A1 | 9/2017 | Vaissiere et al. |
| 2017/0286422 | A1 | 10/2017 | Bhowan et al. |
| 2017/0323089 | A1 | 11/2017 | Duggal et al. |
| 2018/0013639 | A1 | 1/2018 | Sanders et al. |
| 2018/0025092 | A1 | 1/2018 | Aharonov et al. |
| 2018/0046780 | A1 | 2/2018 | Graiver et al. |
| 2018/0075104 | A1 | 3/2018 | Oberbreckling et al. |
| 2018/0089424 | A1 | 3/2018 | Yang et al. |
| 2018/0121311 | A1 | 5/2018 | Gong et al. |
| 2018/0123918 | A1 | 5/2018 | Steinhauser et al. |
| 2018/0165604 | A1 | 6/2018 | Minkin et al. |
| 2018/0173502 | A1 | 6/2018 | Biskup et al. |
| 2018/0276343 | A1 | 9/2018 | Curbera et al. |
| 2018/0285759 | A1 | 10/2018 | Wood et al. |
| 2018/0307710 | A1 | 10/2018 | Dai et al. |
| 2019/0050465 | A1 | 2/2019 | Khalil et al. |
| 2019/0079957 | A1 | 3/2019 | Gao et al. |
| 2019/0079994 | A1 | 3/2019 | Ma et al. |
| 2019/0102700 | A1 | 4/2019 | Babu et al. |
| 2019/0138806 | A1 | 5/2019 | Banerjee et al. |
| 2019/0147076 | A1 | 5/2019 | Yang et al. |
| 2019/0188243 | A1 | 6/2019 | Sun et al. |
| 2019/0228343 | A1 | 7/2019 | Gu et al. |
| 2019/0251476 | A1 | 8/2019 | Shiebler et al. |
| 2019/0318272 | A1 | 10/2019 | Sassin |
| 2019/0324765 | A1 | 10/2019 | Tsai et al. |
| 2019/0324767 | A1 | 10/2019 | Stein et al. |
| 2019/0325258 | A1 | 10/2019 | Stein et al. |
| 2019/0325262 | A1 | 10/2019 | Stein et al. |
| 2019/0325351 | A1 | 10/2019 | Stein et al. |
| 2019/0325352 | A1 | 10/2019 | Tsai et al. |
| 2021/0142528 | A1 | 5/2021 | Stawiszynski et al. |

OTHER PUBLICATIONS

"CS1130. Transition to OO programming", Retrieved From: https://www.cs.cornell.edu/courses/cs1130/2012sp/1130selfpaced/, Jan. 2012, 3 Pages.
"OOP: Classes for Geometric Shapes", In Publication of CMPT 166 Fall 2016, Simon Fraser University, Jan. 2016, 5 Pages.
"Unity User Manual (Apr. 2017)", Retrieved From: https://docs.unity3d.com/2017.4/Documentation/Manual/, Jun. 5, 2020, 5 Pages.
"Final Office Action Issued in U.S. Appl. No. 15/958,990", dated Oct. 14, 2021, 49 Pages.
"Non Final Office Action Issued in U.S. Appl. No. 15/958,990", dated May 11, 2021, 52 Pages.
Fayad, et al., "Object-Oriented Application Frameworks", In Journal of Communications of the ACM, vol. 40, Issue 10, Oct. 1, 1997, pp. 32-38.
Konkol, et al., "Brainy: A Machine Learning Library", In Proceedings of International Conference on Artificial Intelligence and Soft Computing, vol. 8468, Jun. 2014, pp. 490-499.
"Final Office Action Issued in U.S. Appl. No. 15/844,861", dated Mar. 4, 2021, 28 Pages.
"Non Final Office Action Issued in U.S. Appl. No. 15/046,199", dated Nov. 9, 2018, 17 Pages.
"Notice of Allowance Issued in U.S. Appl. No. 15/046,199", dated Feb. 5, 2020, 10 Pages.
"Notice of Allowance Issued in U.S. Appl. No. 15/046,199", dated Apr. 23, 2019, 10 Pages.
"Notice of Allowance Issued in U.S. Appl. No. 15/046,199", dated Aug. 5, 2019, 7 Pages.
"Non Final Office Action Issued in U.S. Appl. No. 15/844,861", dated Aug. 6, 2020, 24 Pages.
Fernandez, et al., "Liquid: Unifying Nearline and Offline Big Data Integration", In Proceedings of the 7th Biennial Conference on Innovative Data Systems Research, Jan. 4, 2015, 8 Pages.
Halevy, et al., "Goods: Organizing Google's Datasets", In Proceedings of the International Conference on Management of Data, Jun. 16, 2016, pp. 795-806.
Kong, et al., "Entity Matching Across Multiple Heterogeneous Data Sources", In Proceedings of the International Conference on Database Systems for Advanced Applications, Apr. 16, 2016, pp. 133-146.
Laborde, et al., "A Wait-Free Hash Map", In International Journal of Parallel Programming, vol. 45, Issue 3, Aug. 19, 2015, pp. 421-448.
Xu, et al., "Research on Distributed Computing of EAI Platform System", In Proceedings of the Fourth International Workshop on Advanced Computational Intelligence, Oct. 19, 2011, pp. 7-12.
Barrera, et al., "A Methodology for Empirical Analysis of Permission-Based Security Models and its Application to Android", In Proceedings of the 17th ACM Conference on Computer and Communications Security, Oct. 4, 2010, pp. 73-84.
"Non Final Office Action Issued in U.S. Appl. No. 15/958,999", dated Apr. 13, 2021, 47 Pages.
"Non Final Office Action Issued in U.S. Appl. No. 15/959,000", dated Apr. 14, 2021, 21 Pages.
Maddison, et al., "Structured Generative Models of Natural Source Code", In Proceedings of the 31st International Conference on Machine Learning, Jun. 21, 2014, 9 Pages.

(56) References Cited

OTHER PUBLICATIONS

Sudarsan, et al., "A Product Information Modeling Framework for Product Lifecycle Management", In Journal of Computer-Aided Design, vol. 37, Issue 13, Nov. 1, 2005, 29 Pages.

Bolbolamiri, et al., "Time-Domain Stator Current Condition Monitoring: Analyzing Point Failures Detection by Kolmogorov-Smirnov (K-S) Test", In International Journal of Electrical, Computer, Energetic, Electronic and Communication Engineering vol. 6, Issue 6, 2012, pp. 587-592.

Ivanov, et al., "Kolmogorov-Smirnov Test for Feature Selection in Emotion Recognition from Speech", In Proceedings of IEEE International Conference on Acoustics, Speech and Signal Processing, Mar. 25, 2012, pp. 5125-5128.

Subrahmanyam, et al., "A Modified KS-test for Feature Selection", In IOSR Journal of Computer Engineering, vol. 13, Issue 3, Jul. 2013, pp. 73-79.

Wang, et al., "Data X-Ray: A Diagnostic Tool for Data Errors", In Proceedings of the ACM SIGMOD International Conference on Management of Data, May 31, 2015, pp. 1231-1245.

"Final Office Action Issued in U.S. Appl. No. 15/958,990", dated Jul. 5, 2022, 58 Pages.

"Non Final Office Action Issued in U.S. Appl. No. 15/958,997", dated Aug. 26, 2022, 15 Pages.

"Non Final Office Action Issued in U.S. Appl. No. 15/958,990", dated Jan. 19, 2023, 52 Pages.

\* cited by examiner

FRAMEWORK FOR MANAGING FEATURES ACROSS ENVIRONMENTS

RELATED APPLICATIONS

The subject matter of this application is related to the subject matter in a co-pending non-provisional application entitled "Common Feature Protocol for Collaborative Machine Learning," having Ser. No. 15/046,199, and filing date 17 Feb. 2016.

The subject matter of this application is also related to the subject matter in a co-pending non-provisional application filed on the same day as the instant application, entitled "Managing Derived and Multi-Entity Features Across Environments," having Ser. No. 15/958,990, and filing date Apr. 20, 2018.

BACKGROUND

Field

The disclosed embodiments relate to machine learning systems. More specifically, the disclosed embodiments relate to a framework for managing features across environments.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

To glean such insights, large data sets of features may be analyzed using regression models, artificial neural networks, support vector machines, decision trees, naïve Bayes classifiers, and/or other types of machine-learning models. The discovered information may then be used to guide decisions and/or perform actions related to the data. For example, the output of a machine-learning model may be used to guide marketing decisions, assess risk, detect fraud, predict behavior, and/or customize or optimize use of an application or website.

However, significant time, effort, and overhead may be spent on feature selection during creation and training of machine-learning models for analytics. For example, a data set for a machine-learning model may have thousands to millions of features, including features that are created from combinations of other features, while only a fraction of the features and/or combinations may be relevant and/or important to the machine-learning model. At the same time, training and/or execution of machine-learning models with large numbers of features typically require more memory, computational resources, and time than those of machine-learning models with smaller numbers of features. Excessively complex machine-learning models that utilize too many features may additionally be at risk for overfitting.

Additional overhead and complexity may be incurred during sharing and organizing of feature sets. For example, a set of features may be shared across projects, teams, or usage contexts by denormalizing and duplicating the features in separate feature repositories for offline and online execution environments. As a result, the duplicated features may occupy significant storage resources and require synchronization across the repositories. Each team that uses the features may further incur the overhead of manually identifying features that are relevant to the team's operation from a much larger list of features for all of the teams. The same features may further be identified and/or specified multiple times during different steps associated with creating, training, validating, and/or executing the same machine-learning model.

Consequently, creation and use of machine-learning models in analytics may be facilitated by mechanisms for improving the monitoring, management, sharing, propagation, and reuse of features among the machine-learning models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core)

that executes a particular software module or a piece of code at a particular time, and/or other programmable-logic devices now known or later developed. When the hardware modules or apparatus are activated, they perform the methods and processes included within them.

Figure 1:
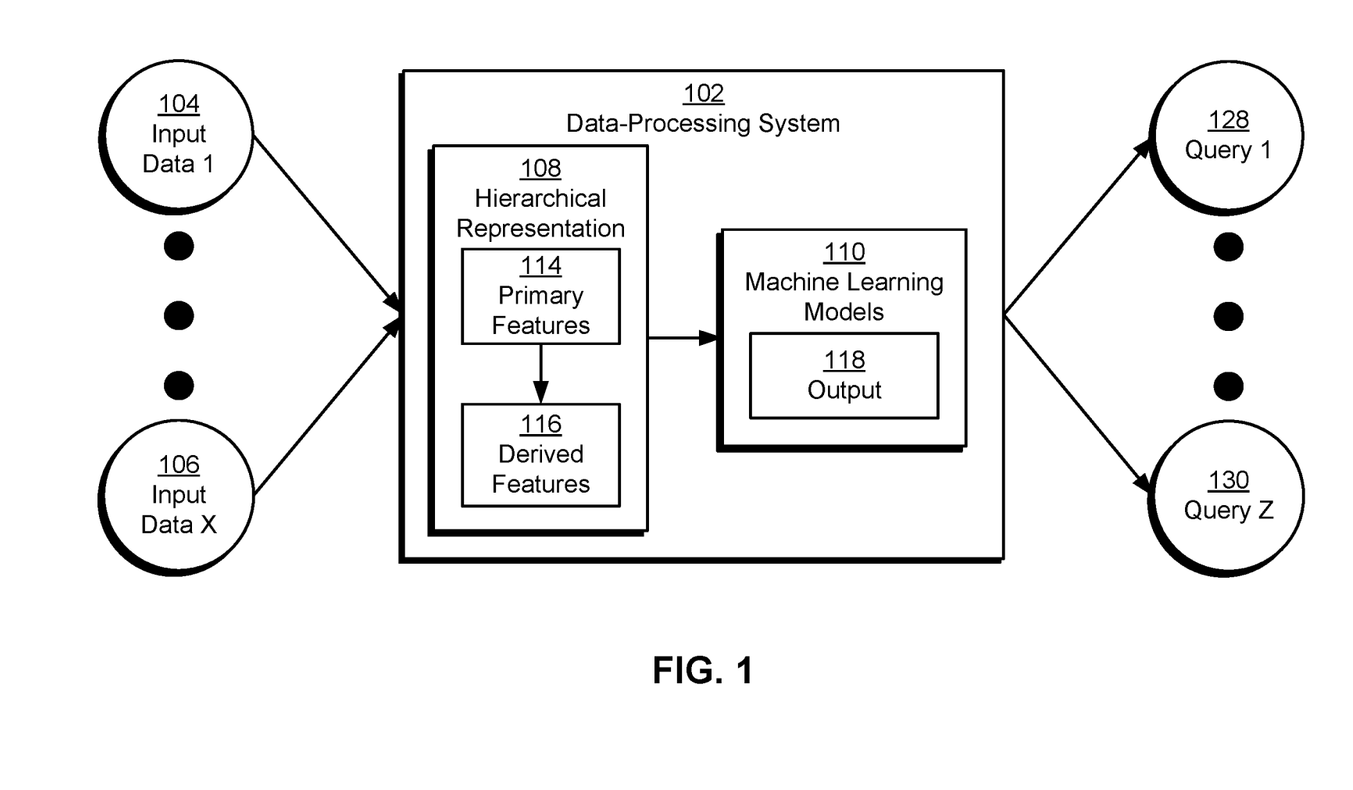
FIG. 1 shows a schematic of a system in accordance with the disclosed embodiments.

The disclosed embodiments provide a method, apparatus, and system for processing data. As shown in FIG. 1, the system includes a data-processing system 102 that analyzes one or more sets of input data (e.g., input data 1 104, input data x 106). For example, data-processing system 102 may create and train one or more machine learning models 110 for analyzing input data related to users, organizations, applications, job postings, purchases, electronic devices, websites, content, sensor measurements, and/or other categories. Machine learning models 110 may include, but are not limited to, regression models, artificial neural networks, support vector machines, decision trees, naïve Bayes classifiers, Bayesian networks, deep learning models, hierarchical models, and/or ensemble models.

In turn, the results of such analysis may be used to discover relationships, patterns, and/or trends in the data; gain insights from the input data; and/or guide decisions or actions related to the data. For example, data-processing system 102 may use machine learning models 110 to generate output 118 that includes scores, classifications, recommendations, estimates, predictions, and/or other properties. Output 118 may be inferred or extracted from primary features 114 in the input data and/or derived features 116 that are generated from primary features 114 and/or other derived features. For example, primary features 114 may include profile data, user activity, sensor data, and/or other data that is extracted directly from fields or records in the input data. The primary features 114 may be aggregated, scaled, combined, and/or otherwise transformed to produce derived features 116, which in turn may be further combined or transformed with one another and/or the primary features to generate additional derived features. After output 118 is generated from one or more sets of primary and/or derived features, output 118 is provided in responses to queries (e.g., query 1 128, query z 130) of data-processing system 102. In turn, the queried output 118 may improve revenue, interaction with the users and/or organizations, use of the applications and/or content, and/or other metrics associated with the input data.

In one or more embodiments, data-processing system 102 uses a hierarchical representation 108 of primary features 114 and derived features 116 to organize the sharing, production, and consumption of the features across different teams, execution environments, and/or projects. Hierarchical representation 108 may include a directed acyclic graph (DAG) that defines a set of namespaces for primary features 114 and derived features 116. The namespaces may disambiguate among features with similar names or definitions from different usage contexts or execution environments. Hierarchical representation 108 may include additional information that can be used to locate primary features 114 in different execution environments, calculate derived features 116 from the primary features and/or other derived features, and track the development of machine learning models 110 or applications that accept the derived features as input.

Consequently, data-processing system 102 may implement, in hierarchical representation 108, a common feature protocol that describes a feature set in a centralized and structured manner, which in turn can be used to coordinate large-scale and/or collaborative machine learning across multiple entities and machine learning models 110. Common feature protocols for large-scale collaborative machine learning are described in a co-pending non-provisional application by inventors David J. Stein, Xu Miao, Lance Wall, Joel D. Young, Eric Huang, Songxiang Gu, Da Teng, Chang-Ming Tsai and Sumit Rangwala, entitled "Common Feature Protocol for Collaborative Machine Learning," having Ser. No. 15/046,199, and filing date 17 Feb. 2016, which is incorporated herein by reference.

In one or more embodiments, primary features 114 and/or derived features 116 are obtained and/or used with an online professional network, social network, or other community of users that is used by a set of entities to interact with one another in a professional, social, and/or business context. The entities may include users that use the online professional network to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

As a result, features 114 and/or derived features 116 may include member features, company features, and/or job features. The member features include attributes from the members' profiles with the online professional network, such as each member's title, skills, work experience, education, seniority, industry, location, and/or profile completeness. The member features also include each member's number of connections in the online professional network, the member's tenure on the online professional network, and/or other metrics related to the member's overall interaction or "footprint" in the online professional network. The member features further include attributes that are specific to one or more features of the online professional network, such as a classification of the member as a job seeker or non-job-seeker.

The member features may also characterize the activity of the members with the online professional network. For example, the member features may include an activity level of each member, which may be binary (e.g., dormant or active) or calculated by aggregating different types of activities into an overall activity count and/or a bucketized activity score. The member features may also include attributes (e.g., activity frequency, dormancy, total number of user actions, average number of user actions, etc.) related to specific types of social or online professional network activity, such as messaging activity (e.g., sending messages within the online professional network), publishing activity (e.g., publishing posts or articles in the online professional network), mobile activity (e.g., accessing the social network through a mobile device), job search activity (e.g., job searches, page views for job listings, job applications, etc.), and/or email activity (e.g., accessing the online professional network through email or email notifications).

The company features include attributes and/or metrics associated with companies. For example, company features for a company may include demographic attributes such as a location, an industry, an age, and/or a size (e.g., small business, medium/enterprise, global/large, number of employees, etc.) of the company. The company features may further include a measure of dispersion in the company, such as a number of unique regions (e.g., metropolitan areas, counties, cities, states, countries, etc.) to which the employees and/or members of the online professional network from the company belong.

A portion of company features may relate to behavior or spending with a number of products, such as recruiting, sales, marketing, advertising, and/or educational technology solutions offered by or through the online professional network. For example, the company features may also include recruitment-based features, such as the number of recruiters, a potential spending of the company with a recruiting solution, a number of hires over a recent period (e.g., the last 12 months), and/or the same number of hires divided by the total number of employees and/or members of the online professional network in the company. In turn, the recruitment-based features may be used to characterize and/or predict the company's behavior or preferences with respect to one or more variants of a recruiting solution offered through and/or within the online professional network.

The company features may also represent a company's level of engagement with and/or presence on the online professional network. For example, the company features may include a number of employees who are members of the online professional network, a number of employees at a certain level of seniority (e.g., entry level, mid-level, manager level, senior level, etc.) who are members of the online professional network, and/or a number of employees with certain roles (e.g., engineer, manager, sales, marketing, recruiting, executive, etc.) who are members of the online professional network. The company features may also include the number of online professional network members at the company with connections to employees of the online professional network, the number of connections among employees in the company, and/or the number of followers of the company in the online professional network. The company features may further track visits to the online professional network from employees of the company, such as the number of employees at the company who have visited the online professional network over a recent period (e.g., the last 30 days) and/or the same number of visitors divided by the total number of online professional network members at the company.

One or more company features may additionally be derived features 116 that are generated from member features. For example, the company features may include measures of aggregated member activity for specific activity types (e.g., profile views, page views, jobs, searches, purchases, endorsements, messaging, content views, invitations, connections, recommendations, advertisements, etc.), member segments (e.g., groups of members that share one or more common attributes, such as members in the same location and/or industry), and companies. In turn, the company features may be used to glean company-level insights or trends from member-level online professional network data, perform statistical inference at the company and/or member segment level, and/or guide decisions related to business-to-business (B2B) marketing or sales activities.

The job features describe and/or relate to job listings and/or job recommendations within the online professional network. For example, the job features may include declared or inferred attributes of a job, such as the job's title, industry, seniority, desired skill and experience, salary range, and/or location. One or more job features may also be derived features 116 that are generated from member features and/or company features. For example, the job features may provide a context of each member's impression of a job listing or job description. The context may include a time and location at which the job listing or description is viewed by the member. The location can encompass physical and/or other types of locations, such as a geographic location, an application (e.g., native application, mobile application, web application, a specific version of an application, etc.), a website, and/or a web page. In another example, some job features may be calculated as cross products, cosine similarities, statistics, and/or other combinations, aggregations, scaling, and/or transformations of member features, company features, and/or other job features.

Those skilled in the art will appreciate that primary features 114 and/or derived features 116 may be obtained from multiple data sources, which in turn may be distributed across different environments. For example, the features may be obtained from data sources in online, offline, nearline, streaming, and/or search-based execution environments. In addition, each data source and/or environment may have a separate application-programming interface (API) for retrieving and/or transforming the corresponding features. Consequently, managing, sharing, obtaining, and/or calculating features across the environments may require significant overhead and/or customization to specific environments and/or data sources.

Figure 2:
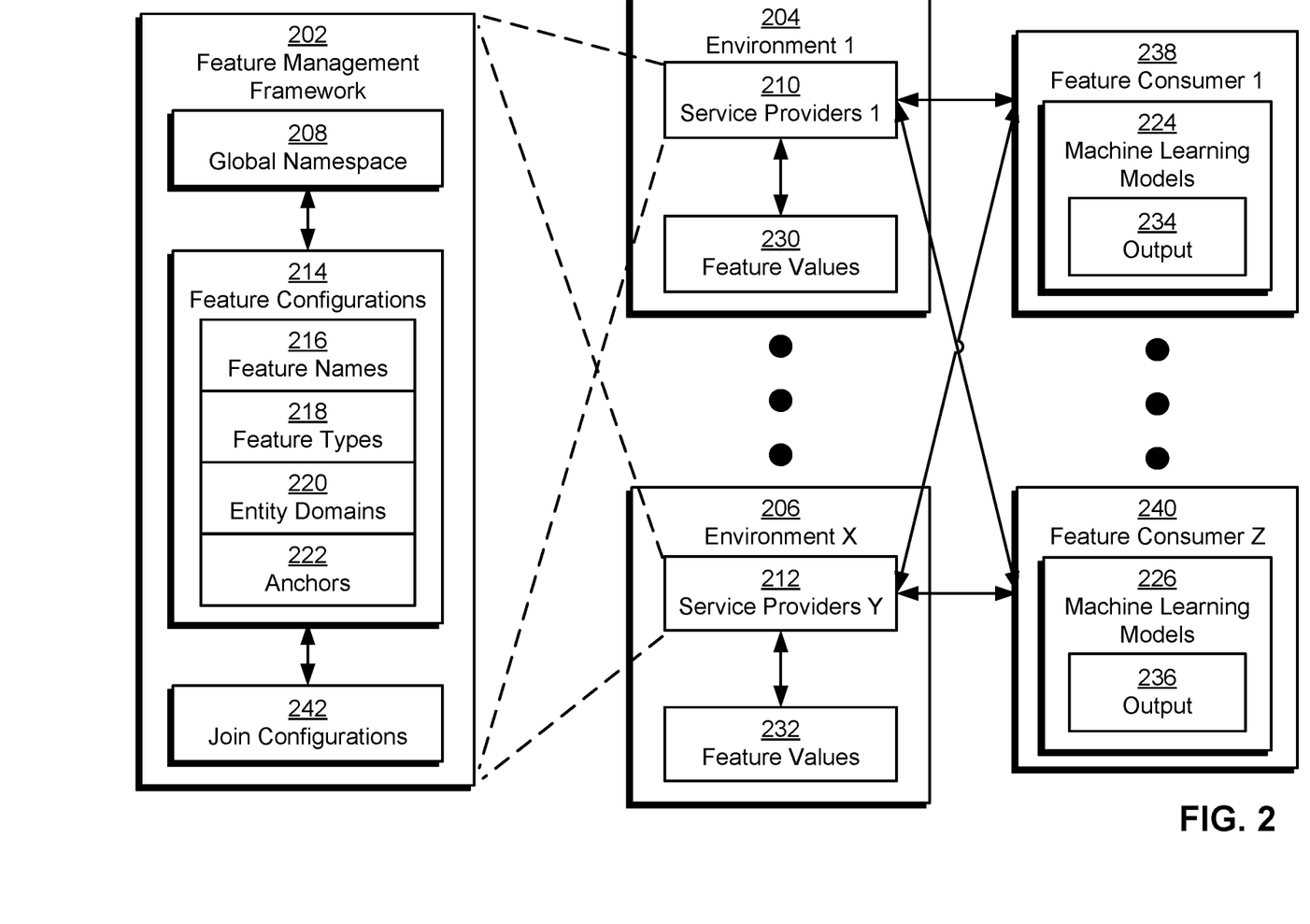
FIG. 2 shows a system for processing data in accordance with the disclosed embodiments.

In one or more embodiments, data-processing system 102 includes functionality to perform centralized feature management in a way that is decoupled from environments, systems, and/or use cases of the features. As shown in FIG. 2, a system for processing data (e.g., data-processing system 102 of FIG. 1) includes a feature management framework 202 that executes in and/or is deployed across a number of service providers (e.g., service providers 1 210, service providers y 212) in different environments (e.g., environment 1 204, environment x 206).

The environments include different execution contexts and/or groups of hardware and/or software resources in which feature values 230-232 of the features can be obtained or calculated. For example, the environments may include an online environment that provides real-time feature values, a nearline or streaming environment that emits events containing near-realtime records of updated feature values, an offline environment that calculates feature values on a periodic and/or batch-processing basis, and/or a search-based environment that performs fast reads of databases and/or other data stores in response to queries for data in the data stores.

One or more environments may additionally be contained or nested in one or more other environments. For example, an online environment may include a "remix" environment that contains a library framework for executing one or more applications and/or generating additional features.

The service providers may include applications, processes, jobs, services, and/or modules for generating and/or retrieving feature values 230-232 for use by a number of feature consumers (e.g., feature consumer 1 238, feature consumer z 240). The feature consumers may use one or more sets of feature values 230-232 as input to one or more machine learning models 224-226 during training, testing, and/or validation of machine learning models 224-226 and/or scoring using machine learning models 224-226. In turn, output 234-236 generated by machine learning models 224-226 from the sets of feature values 230-232 may be used by the feature consumers and/or other components to adjust parameters and/or hyperparameters of machine-learning models 224-226; verify the performance of machine-learning models 224-226; select versions of machine-learning models 224-226 for use in production or real-world settings; and/or make inferences, recommendations, predictions, and/or estimates related to feature values 230-232 within the production or real-world settings.

In one or more embodiments, the service providers use components of feature management framework 202 to generate and/or retrieve feature values 230-232 of features from the environments in a way that is decoupled from the locations of the features and/or operations or computations used to generate or retrieve the corresponding feature values 230-232 within the environments. First, the service providers organize the features within a global namespace 208 that spans the environments. Global namespace 208 may include a hierarchical representation of feature names 216 and use scoping relationships in the hierarchical representation to disambiguate among features with common or similar names, as described in the above-referenced application. Consequently, global namespace 208 may replace references to locations of the features (e.g., filesystem paths, network locations, streams, tables, fields, services, etc.) with higher-level abstractions for identifying and accessing the features.

Second, the service providers use feature configurations 214 in feature management framework 202 to define, identify, locate, retrieve, and/or calculate features from the respective environments. Each feature configuration includes metadata and/or information related to one or more features in global namespace 208. Individual feature configurations 214 can be independently created and/or updated by a user, team, and/or entity without requiring knowledge of feature configurations 214 for other features and/or from other users, teams, and/or entities.

Feature configurations 214 include feature names 216, feature types 218, entity domains 220, and anchors 222 associated with the features. Feature names 216 include globally scoped identifiers for the features, as obtained from and/or maintained using global namespace 208. For example, a feature representing the title in a member's profile with a social network or online professional network may have a globally namespaced feature name of "org.member.profile.title." The feature name may allow the feature to be distinguished from a different feature for a title in a job listing, which may have a globally namespaced feature name of "org.job.title."

Feature types 218 include semantic types that describe how the features can be used with machine learning models 224-226. For example, each feature may be assigned a feature type that is numeric, binary, categorical, categorical set, categorical bag, and/or vector. The numeric type represents numeric values such as real numbers, integers, and/or natural numbers. The numeric type may be used with features such as numeric identifiers, metrics (e.g., page views, messages, login attempts, user sessions, click-through rates, conversion rates, spending amounts, etc.), statistics (e.g., mean, median, maximum, minimum, mode, percentile, etc.), scores (e.g., connection scores, reputation scores, propensity scores, etc.), and/or other types of numeric data or measurements.

The binary feature type includes Boolean values of 1 and 0 that indicate if a corresponding attribute is true or false. For example, binary features may specify a state of a member (e.g., active or inactive) and/or whether a condition has or has not been met.

Categorical, categorical set, and categorical bag feature types include fixed and/or limited names, labels, and/or other qualitative attributes. For example, a categorical feature may represent a single instance of a color (e.g., red, blue, yellow, green, etc.), a type of fruit (e.g., orange, apple, banana, etc.), a blood type (e.g., A, B, AB, O, etc.), and/or a breed of dog (e.g., collie, shepherd, terrier, etc.). A categorical set may include one or more unique values of a given categorical feature, such as {apple, banana, orange} for the types of fruit found in a given collection. A categorical bag may include counts of the values, such as {banana: 2, orange: 3} for a collection of five pieces of fruit and/or a bag of words from a sentence or text document.

The vector feature type represents an array of features, with each dimension or element of the array corresponding to a different feature. For example, a feature vector may include an array of metrics and/or scores for characterizing a member of a social network. In turn, a metric such as Euclidean distance or cosine similarity may be calculated from feature vectors of two members to measure the similarity, affinity, and/or compatibility of the members.

Those skilled in the art will appreciate that feature types 218 may be represented in a variety of ways. For example, a categorical, categorical set, and/or categorical bag feature may be represented and/or stored using one or more vectors. In another example, feature types 218 may include matrices and/or other higher-dimensional representations of attributes or values.

Entity domains 220 identify classes of entities described by the features. For example, entity domains 220 for features related to a social network or online professional network may include members, jobs, groups, companies, products, business units, advertising campaigns, and/or experiments. Entity domains 220 may be encoded and/or identified within global namespace 208 (e.g., "jobs.title" versus "member.title" for features related to professional titles) and/or specified separately from global namespace 208 (e.g., "feature1.entitydomain=members"). One or more features may additionally have compound entity domains 220. For example, an interaction feature between members and jobs may have an entity domain of {members, jobs}.

Anchors 222 include metadata that describes how to access the features in specific environments. For example, anchors 222 may include locations or paths of the features in the environments; classes, functions, methods, calls, and/or other mechanisms for accessing data related to the features; and/or formulas or operations for calculating and/or generating the features from the data.

A service provider may use an anchor for accessing a feature in the service provider's environment to retrieve and/or calculate one or more feature values (e.g., feature values 230-232) for the feature and provide the feature values to a feature consumer. For example, the service provider may receive, from a feature consumer, a request for obtaining features values of one or more features from the service provider's environment. The service provider may match feature names in the request to one or more anchors 222 for the corresponding features and use the anchors and one or more entity keys (e.g., member keys, job keys, company keys, etc.) in the request to obtain feature values for the corresponding entities from the environment. The service provider may optionally format the feature values according to parameters in the request and return the feature values to the feature consumer for use in training, testing, validating, and/or executing machine learning models (e.g., machine learning models 224-226) associated with the feature consumer.

An example anchor for obtaining a set of features from an offline environment may include the following representation:

```
member-preferences: {
    source: "/data/databases/CareersDB/MemberPreference/#LATEST"
    extractor: "org.anchor.PreferencesFeatures"
```

-continued

```
    features: [
        companySize,
        preference_seniority,
        preference_industry,
        preference_industryCategory,
        preference_location
    ]
}
```

The above representation indicates that the anchor has a name of "member-preferences." The representation also contains a set of fields, which include a "source" that provides a path and/or location of the features in an offline data store ("/data/databases/CareersDB/MemberPreference/#LATEST"). The fields also include an "extractor" ("org.anchor.PreferencesFeatures") representing a class, method, function, and/or other mechanism for obtaining the features from the source. Finally, the fields include a set of feature names of the features ("companySize", "preference_seniority", "preference_industry", "preference_industryCategory", "preference_location").

An example anchor for obtaining a set of features from a content-processing platform may include the following representation:

```
member-geolocation: {
    source:
    "/data/derived/standardization/members_std_data/#LATEST"
    key: "memberId"
    features: {
        member_geoCountry: "geoStdData.countryCode"
        member_geoRegion: "geoStdData.countryCode + ':' +
            geoStdData.regionCode"
    }
}
```

The above representation indicates that the anchor has a name of "member-geolocation" that is followed by a set of fields. The fields include a "source" specifying a path or location of the features in the content-processing platform ("/data/derived/standardization/members_std_data/#LATEST") and a "key" for retrieving rows containing the features ("memberId"). The fields also specify a set of "features" named "member_geoCountry" and "member_geoRegion." The first feature is obtained from a "geoStdData.countryCode" field from the source, and the second feature is obtained by concatenating the "geoStdData.countryCode" field, a colon, and a "geoStdData.regionCode" field from the source. As a result, the anchor may be used to obtain standardized features associated with members of a social network, online professional network, and/or other online community, such as standardized countries and/or regions of the members.

An example anchor for obtaining a set of features from an online environment may include the following representation:

```
"currentCompany-ei": {
    source: "MemberStdCmp"
    extractor: "($.company.urn in companies if $.isCurrent)"
    features: [currentCompany]
}
```

The representation above includes a name of "currentCompany-ei" for the anchor and a set of fields. The first field specifies a "source" of "MemberStdCmp," and the second field specifies an "extractor" that includes an operation for obtaining feature values of the features ("($.company.urn in companies if $.isCurrent)"). The third field indicates that a set of "features" with one element named "currentCompany" can be extracted from the source using the extractor. In other words, the anchor may specify that a feature named "currentCompany" is located in a source named "MemberStdCmp" and can be populated from a value of "company.urn" in a "companies" object within the source if a condition of "isCurrent" is met.

In one or more embodiments, different types of service providers are implemented in the environments to provide different types of functionality related to accessing, querying, obtaining, and/or formatting feature values 230-232 of features in the environments. For example, the service providers may provide different application-programming interfaces (APIs), workflows, and/or other mechanisms for requesting or obtaining feature values 230-232 from online, offline, nearline, streaming, search-based, and/or other environments.

A service provider for an offline environment may generate a data set of requested feature values in a common format (e.g., table, structured data, comma-separated values, etc.). For example, the service provider may obtain a request containing a list of feature names from a feature consumer and use global namespace 208 and/or feature configurations 214 to retrieve one or more anchors 222 for the corresponding features. The service provider may then use information in the anchors to extract feature values of the features from the offline environment, format the features, and return the formatted features to the feature consumer.

Another service provider for an offline environment may join feature values for one or more features with observation data associated with the feature values. The operation of the service provider may be customized using one or more join configurations 242 in feature management framework 202. Each join configuration may identify the features and observation data and include one or more join keys that are used by the service provider to perform join operations.

An example join configuration may include the following representation:

```
{
    inputPath: "/jobs/training-examples"
    label: "label"
    joins: [
        {
            key: "memberId"
            featureList: [jobPreference_location,
                jobPreference_companySize]
        }, {
            key: "jobId"
            featureList: [job_companySize]
        }, {
            key: ["memberId", "jobId"]
            featureList: [member_job_skillSimilarity]
        }
    ]
}
```

The representation above includes an "inputPath" of "/jobs/training-examples" and a label of "label" for the observation data. The observation data is joined with two features named "jobPreference_location" and "jobPreference_companySize" using a join key of "memberId," a feature named "job_companySize" using a join key of "jobId," and a feature named "memberjob_skillSimilarity" using two join keys of "memberId" and "jobId." As a result, the join configuration may be used to join labels in training data with feature values related to member preferences for jobs and attributes of jobs.

A first service provider for an online environment may fetch feature values for individual entity keys from online data stores and return the feature values in response to requests containing the entity keys. A second service provider for an online environment may batch entity keys from multiple requests and retrieve feature values for the batched entity keys using a batch request to one or more online data stores. For example, the first service provider may receive a request containing a member ID and a set of feature names 216 from a feature consumer, retrieve feature values of the corresponding features for a member represented by the member ID from an online data source, and return the feature values in a response to the request. The second service provider may obtain a set of member IDs or job IDs from one or more requests, batch the member or job IDs into one or more calls to an online service or data source, retrieve the requested feature values using the calls, and return the feature values in response to the request(s).

A service provider in a streaming environment such as Apache Kafka (Kafka™ is a registered trademark of the Apache Software Foundation) may obtain, from an anchor, a topic identifying a stream of messages in the environment. The service provider may then retrieve feature values for one or more features from messages in the stream and provide the feature values on a nearline basis to one or more feature consumers. Another service provider in the streaming environment and/or another environment may obtain a job ID from a message in the stream and use the job ID as a join key for joining other data in the message and/or feature values in the other environment.

By using service providers in different environments to implement, provide, and/or use a uniform feature management framework 202 containing global namespace 208, feature configurations 214, anchors 222, and/or join configurations 242, the system of FIG. 2 may reduce complexity and/or overhead associated with generating, managing, and/or retrieving features. In particular, the system may allow feature producers to quickly add features to the system by providing feature configurations 214 and/or anchors 222 that adhere to a common data model according to APIs for individual environments and/or service providers. Similarly, feature consumers can use the same APIs and/or different APIs with the service providers to identify features by globally namespaced feature names 216 and retrieve the corresponding feature values 230-232 without knowing or understanding where the features are located and/or how the features are generated. Consequently, the system may provide technological improvements related to the development and use of computer systems, applications, services, and/or workflows for producing features, consuming features, and/or using features with machine learning models.

Those skilled in the art will appreciate that the system of FIG. 2 may be implemented in a variety of ways. First, feature management framework 202, the service providers, and/or the environments may be provided by a single physical machine, multiple computer systems, one or more virtual machines, a grid, one or more databases, one or more filesystems, and/or a cloud computing system. Moreover, various components of the system may be configured to execute in an offline, online, and/or nearline basis to perform different types of processing related to managing, accessing, and using features, feature values, and machine learning models 224-226.

Second, feature configurations 214, feature values, and/or other data used by the system may be stored, defined, and/or transmitted using a number of techniques. For example, the system may be configured to accept features from different types of repositories, including relational databases, graph databases, data warehouses, filesystems, streams, online data stores, and/or flat files. The system may also obtain and/or transmit feature configurations 214, feature values, and/or other data used by or with feature management framework 202 in a number of formats, including database records, property lists, Extensible Markup language (XML) documents, JavaScript Object Notation (JSON) objects, and/or other types of structured data. Each feature configuration may further encompass one or more features, anchors 222, service providers, and/or environments.

In another example, global namespace 208 and/or feature configurations 214 may be stored at individual service providers, in a centralized repository that is synchronized with and/or replicated to the service providers, and/or in a distributed ledger or store that is maintained and/or accessed by the service providers. Each service provider may further include or have access to all feature configurations 214 for all features across all environments, or each service provider may include or have access to a subset of feature configurations 214, such as feature configurations 214 for features that are retrieved or calculated by that service provider.

Figure 3:
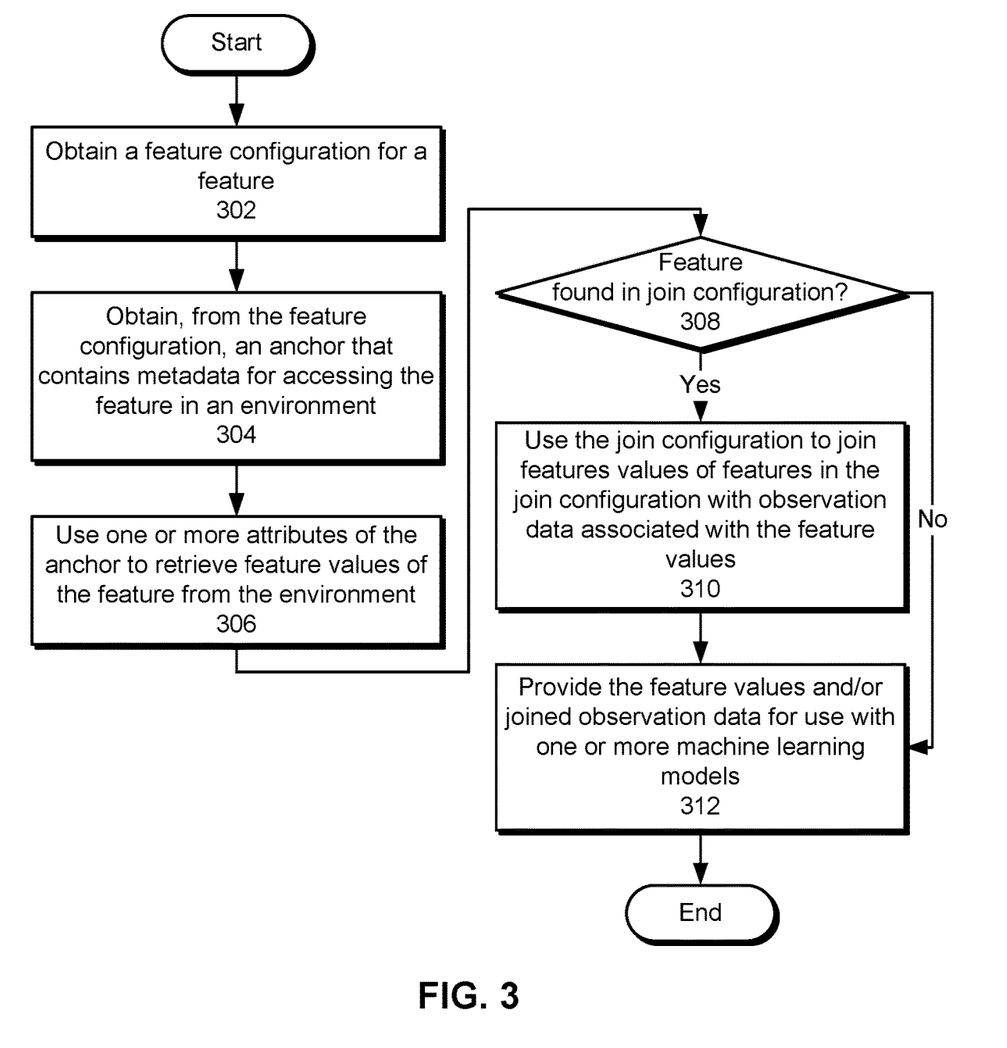
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a feature configuration for a feature is obtained (operation 302). The feature configuration includes a feature name, feature type, and/or entity domain for the feature. The feature configuration also includes an anchor that contains metadata for accessing the feature in an environment, which is obtained from the feature configuration (operation 304). For example, the anchor may identify a location or path of the feature; methods, classes, calls, and/or other mechanisms for obtaining data related to the feature; and/or formulas or operations for producing or calculating feature values of the feature from the data.

One or more attributes of the anchor are used to retrieve feature values of the feature from the environment (operation 306), as described in further detail below with respect to FIG. 4. For example, one or more workflows identified by the anchor may be used to generate the feature values in an offline environment. In another example, one or more calls to a data store or online service identified by the anchor may be used to obtain the feature values in an online environment. In a third example, a topic identifying a stream of messages may be from the anchor, and the feature values may be obtained from one or more messages in the stream.

The feature may also be found in a join configuration (operation 308). For example, the join configuration may specify feature names of the feature and/or additional features, as well as one or more join keys associated with the features. If the feature is included in the join configuration, the join configuration is used to join feature values of the feature with observation data associated with the feature values (operation 310). Continuing with the previous example, the join keys may be obtained from the join configuration and used to join feature values of the features with labels for the corresponding entities. If the feature is not found in any join configurations, joining of the feature values with other feature values and/or observation data may be omitted.

Finally, the feature values and/or joined observation data are provided for use with one or more machine learning models (operation 312). For example, the joined data may be used as training, test, and/or validation data for a machine learning model. In another example, feature values of the feature may be provided as input to a machine learning model, and a score may be obtained as output from the machine learning model. The score may then be used to generate recommendations, predictions, estimates, and/or other types of inference related to the feature and/or corresponding entity.

Figure 4:
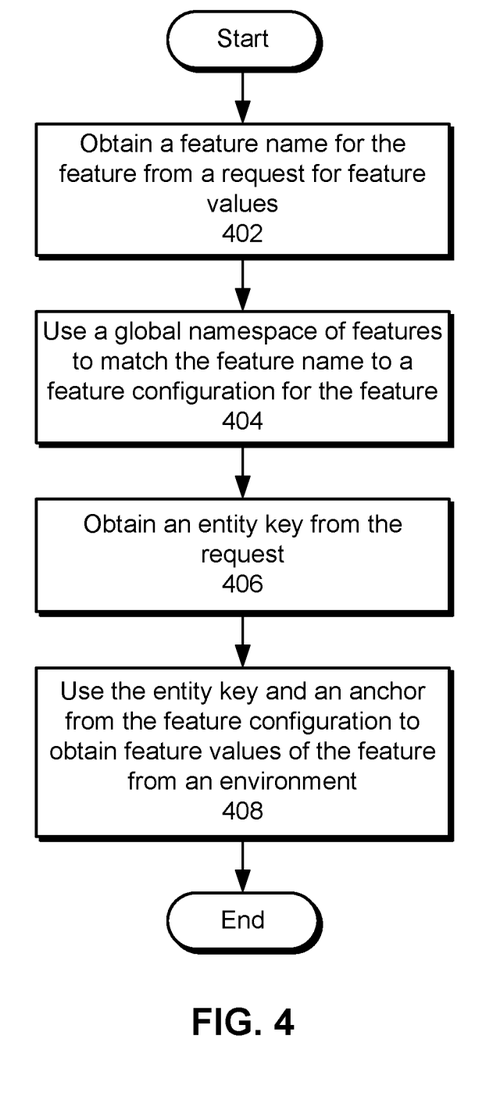
FIG. 4 shows a flowchart illustrating the processing of a request for feature values of a feature in accordance with the disclosed embodiments.

FIG. 4 shows a flowchart illustrating the processing of a request for feature values of a feature in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a feature name for the feature is obtained from a request for feature values (operation 402) of the feature. For example, the feature name may be included in an API call, workflow configuration, and/or other mechanism for obtaining the feature values.

Next, a global namespace of features is used to match the feature name to a feature configuration for the feature (operation 404). For example, the global namespace may be used to organize and/or disambiguate features across multiple environments, use cases, and/or contexts. As a result, the global namespace may be used to uniquely identify the feature and obtain a feature configuration containing the feature name.

An entity key is also obtained from the request (operation 406). For example, the entity key may include a member ID, job ID, and/or other identifier for one or more entities for which the feature values are to be obtained. The entity key and an anchor from the feature configuration are then used to obtain the feature values from an environment (operation 408). For example, the anchor may identify a database, data store, path, network location, service, and/or other source of the feature values, and the entity key and/or other attributes of the anchor may be used to retrieve the feature values from the source. In another example, a batch request containing the entity key and additional entity keys from other requests may be generated from the attributes and used to retrieve a set of feature values for multiple entities from the environment. The feature values may then be returned in response to the requests according to the entity keys in the requests.

Figure 5:
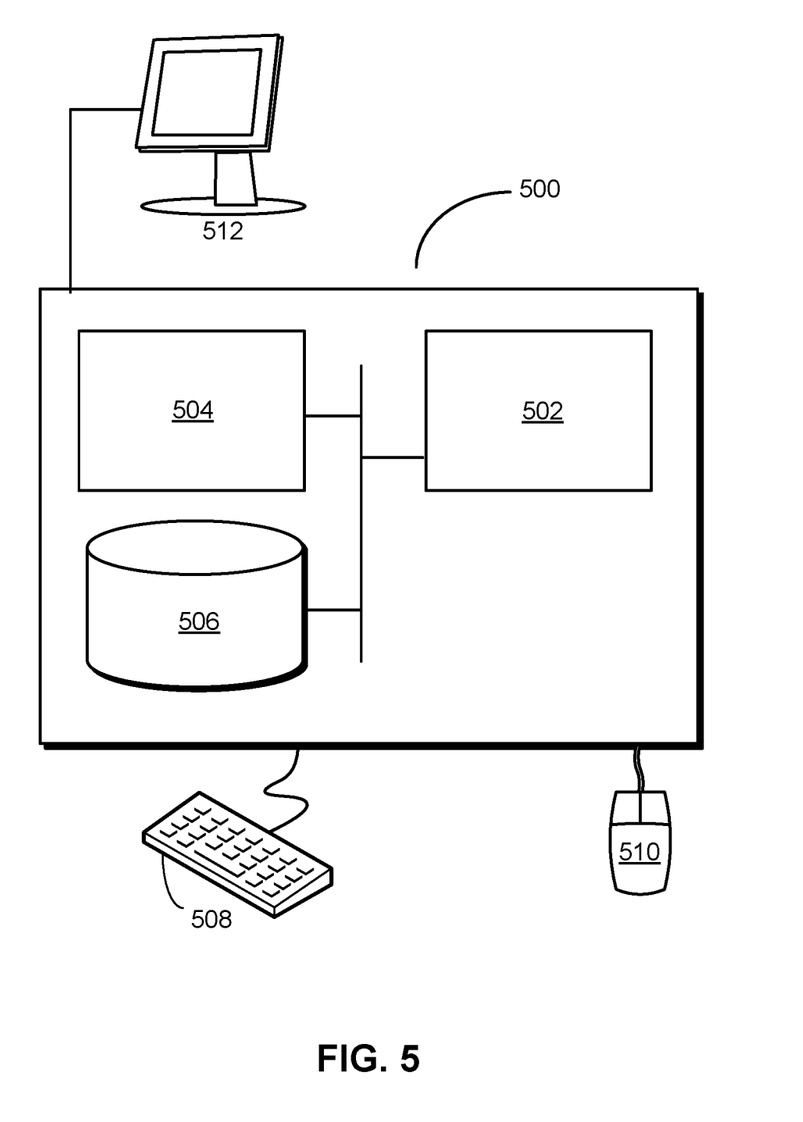
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes a set of service providers executing in multiple environments, one or more of which may alternatively be termed or implemented as a module, mechanism, or other type of system component. Each service provider may obtain a feature configuration for a feature. Next, the service provider may obtain, from the feature configuration, an anchor containing metadata for accessing the feature in an environment, such as the environment in which the service provider executes. The service provider may then use one or more attributes of the anchor to retrieve one or more feature values of the feature from the environment. Finally, the service provider provides the feature value(s) for use with one or more machine-learning models.

In addition, one or more components of computer system 500 may be remotely located and connected to the other components over a network. Portions of the present embodiments (e.g., service providers, environments, feature consumers, feature management framework, etc.) may also be located on different nodes of a distributed system that implements the embodiments. For example, the present embodiments may be implemented using a cloud computing system that manages, defines, and/or retrieves features in a set of remote environments.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
obtaining an entity key from a request;
using the entity key and one or more attributes of the anchor, retrieving one or more feature values of the feature from the specific environment of the plurality of different computing environments; and
providing the one or more feature values retrieved from the specific environment for use with one or more machine learning models.

2. A method, comprising:
obtaining a feature configuration for a feature;
obtaining, by a computer system from the feature configuration, an anchor comprising metadata for accessing the feature in an environment;
using one or more attributes of the anchor to retrieve, by the computer system, one or more feature values of the feature from the environment; and
providing the one or more feature values for use with one or more machine learning models;
wherein using the one or more attributes of the anchor to retrieve the one or more feature values from the environment comprises:

obtaining an entity key from a request; and
using the entity key and the one or more attributes to obtain the one or more feature values from the environment; and
wherein using the entity key and the one or more attributes to obtain the one or more feature values from the environment comprises:
using the one or more attributes to generate a batch request comprising the entity key and additional entity keys from other requests; and
using the batch request to retrieve a set of feature values for the feature from the environment.

3. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
using the one or more attributes of the anchor, retrieving one or more feature values of the feature from the specific environment of the plurality of different computing environments; and
providing the one or more feature values retrieved from the specific environment for use with one or more machine learning models;
wherein the feature configuration comprises:
a feature name;
a feature type of the feature; and
an entity domain of the feature.

4. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
using the one or more attributes of the anchor, retrieving one or more feature values of the feature from the specific environment of the plurality of different computing environments;
providing the one or more feature values retrieved from the specific environment for use with one or more machine learning models;
obtaining a join configuration comprising the feature and one or more additional features; and
using the join configuration to join the one or more feature values and additional feature values for the one or more additional features with observation data associated with the one or more feature values and the additional feature values.

5. The method of claim 4, wherein using the join configuration to join the feature and the one or more additional features with the observation data comprises:
obtaining one or more join keys from the join configuration; and
using the one or more join keys to join the feature and the one or more additional features with the observation data.

6. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
using the one or more attributes of the anchor, retrieving one or more feature values of the feature from the specific environment of the plurality of different computing environments; and
providing the one or more feature values retrieved from the specific environment for use with one or more machine learning models;
wherein using the one or more attributes of the anchor to retrieve the one or more features values from the specific environment comprises:
obtaining a topic identifying a stream of messages from the anchor; and
obtaining, from the specific environment, the one or more feature values from one or more messages in the stream.

7. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
using the one or more attributes of the anchor, retrieving one or more feature values of the feature from the specific environment of the plurality of different computing environments; and
providing the one or more feature values retrieved from the specific environment for use with one or more machine learning models;
wherein the one or more attributes comprises at least one of:
a source of the feature within the specific environment;
a mechanism for obtaining data related to the feature; or
an operation for producing the one or more feature values from the data.

8. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
using the one or more attributes of the anchor, retrieving one or more feature values of the feature from the specific environment of the plurality of different computing environments; and
providing the one or more feature values retrieved from the specific environment for use with one or more machine learning models;
wherein the specific environment comprises at least one of:
an online environment;
a nearline environment;
an offline environment;
a stream-processing environment; or
a search-based environment.

9. A method, comprising:
obtaining a feature configuration for a feature;
the feature having a plurality of different feature values across a plurality of different computing environments;
obtaining an anchor from the feature configuration, the anchor comprising metadata and one or more attributes;
using the metadata, accessing the feature in a specific environment of the plurality of different computing environments;
using the one or more attributes of the anchor, retrieving one or more feature values of the feature from the specific environment of the plurality of different computing environments; and
providing the one or more feature values retrieved from the specific environment for use with one or more machine learning models;
wherein the specific environment is contained within another environment.

10. A system, comprising:
one or more processors; and
memory storing instructions that, when executed by the one or more processors, cause the system to:
obtain a feature configuration for a feature;
obtain, from the feature configuration, an anchor comprising metadata for accessing the feature in an environment;
obtain an entity key from a request;
use the entity key and one or more attributes of the anchor to retrieve one or more feature values of the feature from the environment; and
provide the one or more feature values for use with one or more machine learning models.

11. The system of claim 10, wherein using the entity key and the one or more attributes to obtain the one or more feature values from the environment comprises:
using the one or more attributes to generate a batch request comprising the entity key and additional entity keys from other requests; and
using the batch request to retrieve a set of feature values for the feature from the environment.

12. The system of claim 10, wherein the feature configuration further comprises:
a feature name;
a feature type of the feature; and
an entity domain of the feature.

13. The system of claim 10, wherein using the one or more attributes of the anchor to retrieve the one or more features values from the environment comprises:
obtaining a topic identifying a stream of messages from the anchor; and
obtaining, from the environment, the one or more feature values from one or more messages in the stream.

14. The system of claim 10, wherein the one or more attributes comprise at least one of:
a source of the feature within the environment;
a mechanism for obtaining data related to the feature; or
an operation for producing the one or more feature values from the data.

15. The system of claim 10, wherein the environment comprises at least one of:
an online environment;
a nearline environment;
an offline environment;
a stream-processing environment; or
a search-based environment.

16. A non-transitory computer-readable storage medium storing instructions that when executed by a computer cause the computer to perform a method, the method comprising:
obtaining a feature configuration for a feature;
obtaining, from the feature configuration, an anchor comprising metadata for accessing the feature in an environment;
using one or more attributes of the anchor to retrieve one or more feature values of the feature from the environment;
obtaining a join configuration comprising the feature and one or more additional features;
using the join configuration to join the one or more feature values and additional feature values for the one or more additional features with observation data associated with the one or more feature values and the additional feature values; and
providing the one or more feature values for use with one or more machine learning models.

* * * * *